(12) United States Patent
Yomoda

(10) Patent No.: US 7,941,183 B2
(45) Date of Patent: May 10, 2011

(54) TELEPHONE AND INCOMING CALL NOTIFICATION METHOD FOR TELEPHONE

(75) Inventor: Miyuki Yomoda, Saitama (JP)

(73) Assignee: NEC Corporation, Tokyo (JP)

( * ) Notice: Subject to any disclaimer, the term of this patent is extended or adjusted under 35 U.S.C. 154(b) by 715 days.

(21) Appl. No.: 11/994,736

(22) PCT Filed: Jun. 6, 2006

(86) PCT No.: PCT/JP2006/311340
§ 371 (c)(1),
(2), (4) Date: Jan. 4, 2008

(87) PCT Pub. No.: WO2007/004382
PCT Pub. Date: Jan. 11, 2007

(65) Prior Publication Data
US 2009/0080634 A1 Mar. 26, 2009

(30) Foreign Application Priority Data
Jul. 5, 2005 (JP) .................................. 2005-196794

(51) Int. Cl.
*H04M 1/00* (2006.01)

(52) U.S. Cl. .................. 455/556.2; 455/414.1; 455/567; 455/560; 455/412.1; 455/412.2; 379/373.02; 379/373.01; 379/373.03; 379/374.02

(58) Field of Classification Search .............. 455/556.2, 455/414.1, 567, 560, 412.1, 412.2; 379/373.02, 379/373.01, 373.03, 374.02
See application file for complete search history.

(56) References Cited

U.S. PATENT DOCUMENTS

| 6,373,925 | B1 * | 4/2002 | Guercio et al. ................. 379/82 |
| 6,804,508 | B1 * | 10/2004 | Yamada ..................... 455/414.1 |
| 6,944,285 | B2 * | 9/2005 | Hayakawa et al. ...... 379/373.02 |
| 7,224,792 | B2 * | 5/2007 | Fusco ........................ 379/374.02 |
| 7,295,863 | B2 * | 11/2007 | Takenaka ..................... 455/567 |
| 2004/0076278 | A1 | 4/2004 | Hayakawa et al. |

FOREIGN PATENT DOCUMENTS

| JP | 5-55644 U | 7/1993 |
| JP | 11-112624 A | 4/1999 |
| JP | 11-341118 | 12/1999 |
| JP | 2000-069515 A | 3/2000 |
| JP | 2000-307707 A | 11/2000 |
| JP | 2001-320448 A | 11/2001 |
| JP | 2002-009905 | 1/2002 |

OTHER PUBLICATIONS

Chinese Office Action issued for counterpart Chinese Appl No. 200680024484.7, date of issue May 27, 2010 (English translation attached).

* cited by examiner

*Primary Examiner* — Sanh D Phu
(74) *Attorney, Agent, or Firm* — Dickstein Shapiro LLP

(57) ABSTRACT

A telephone and an incoming call notification method for the telephone in which telephone book data can be used to sound an incoming call sound of a specified date such as a birthday for a specific caller. When an incoming call to the mobile telephone of the present invention arrives from another telephone (s21), a control part of the mobile telephone determines whether or not a notification of the caller's telephone number has been made (s22). The birthday or the like of the caller can be quickly relayed before the telephone is taken off-hook, and an entertainment function can be provided.

12 Claims, 7 Drawing Sheets

FIG. 8

| DATE DATA | NAME DATA | INCOMING CALL SOUND DATA |
|---|---|---|
| 1/1 | NEW YEAR'S DAY | MELODY 0 |
| 12/25 | CHRISTMAS | MELODY 5 |
| 7/7 | WEDDING ANNIVERSARY | NO CHANGE |
| ⋮ | ⋮ | ⋮ |
| 6/26 | GIRLFRIEND'S BIRTHDAY | MELODY 1 | ing call sound that differs from the ordinary incoming call sound when the incoming call is on a date specified for the caller.

TELEPHONE AND INCOMING CALL NOTIFICATION METHOD FOR TELEPHONE

TECHNICAL FIELD

The present invention relates to a telephone as exemplified by a mobile telephone, and particularly relates to a telephone which has a notification function for anniversaries and the like.

BACKGROUND ART

FIG. 8 is a diagram showing a mobile telephone. As is shown in the drawing, a mobile telephone is known whereby the user thereof registers, in advance, sets of respective data for specified dates, the names (content) for these specified dates, and incoming call sounds, so that when the specified dates arrive, the incoming call sounds registered for these specified dates are played for all of the incoming calls, thus making it possible for the user to easily recognize that the day is a specified date by the change from an ordinary incoming call sound to a specified incoming call sound (see patent document 1).

Patent document 1: Japanese Laid-Open Patent Application No. 2001-320448

DISCLOSURE OF THE INVENTION

Problems the Invention is Intended to Solve

In conventional mobile telephones that are able to recognize specified dates such as anniversaries and the like, the relationship between specified dates and incoming call sounds is registered as specified date data, and the incoming call sounds registered for these specified dates are automatically played. Accordingly, these specified dates can be recognized as a result of the fact that the specified dates have a specified incoming call sound that differs from that of other dates. However, with such mobile telephones, the incoming call sound for the specified date is sounded for each incoming call on the specified date regardless of who the actual caller is, so that this is merely a simple notification function based on the incoming call sound.

Furthermore, in cases where a specified item exists for a number of persons on the same date, the individual contents for the specified date cannot be correctly recognized unless the system is devised so that recognition is made possible by displaying individual contents on a display screen or the like.

Furthermore, it is necessary for the user to register dates, names, incoming call sounds, and the like in sets as newly registered date data, and when persons connected with the specified dates or the like are also registered, the duplicate registered items that are added to the standard telephone book function or the like that is provided are increased, so that the input operations are increased, which is inconvenient.

(Object)

Accordingly, it is an object of the present invention to solve the abovementioned problems, and to provide a telephone and an incoming call notification method for a telephone which are devised so that incoming call sounds for specified dates according to callers can be sounded by utilizing telephone book data.

It is another object of the present invention to provide a telephone and an incoming call notification method for a telephone that are devised so that specified date information for callers can be quickly relayed before the telephone is taken off-hook in the case of an incoming call.

It is another object of the present invention to provide a telephone and incoming call notification method for a telephone in which an alarm sound for specified dates can be sounded using an alarm function utilizing telephone book data.

It is another object of the present invention to provide a telephone and incoming call notification method for a telephone in which specified date information can be reflected in a schedule function.

It is another object of the present invention to provide a telephone and incoming call notification method for a telephone in which an entertainment function having a minimal amount of input operations can be enabled by utilizing a telephone book function that controls various types of individual data loaded in the telephone so that birthdays and the like are registered in this telephone book.

Means for Solving the Problems

The telephone of the present invention is characterized in comprising: a telephone book data memory part for storing a name of a telephone user, a telephone number, and specific date information for the user; a detecting part for detecting a telephone number of a caller when an incoming call is received; a notification part for emitting an incoming call sound; and a control part, which refers to the telephone book data memory part and identifies the caller from the user name on the basis of the telephone number of the caller as detected by the detection part, and which controls the notification part so that notification is performed by switching the incoming call sound to a specified incoming call sound that differs from the ordinary incoming call sound when the incoming call is on a date specified for the caller.

The telephone may have a display part for displaying images, and the control part may control the display part so that the image is switched to a specified display image (including messages) that differs from the ordinary incoming call display image, and so that this image is displayed, in cases where the incoming call sound is switched to the specified incoming call sound.

The system may be devised so that information about an incoming call sound and a display image for a specified date can be registered in the telephone book data memory part.

Furthermore, the telephone may have an alarm sounding part that emits an alarm sound when a set time has arrived, and the control part may refer to information stored in the telephone book data memory part when the alarm sounding part emits an alarm sound, and may control the alarm sounding part so that notification is made by switching the alarm sound to a specified alarm sound that differs from the ordinary alarm sound in a case where the date is a specified date obtained from the specified date information.

Furthermore, the telephone may have a schedule registration part for registering a schedule, and the control part may automatically register the specified date information in the schedule registration part when the specified date information is registered in the telephone book data memory part.

Furthermore, the specified dates may be birthdays.

The incoming call notification method for a telephone according to the present invention is characterized in comprising using telephone book data that is loaded in the telephone and that registers a name of a telephone user, a telephone number, and specified date information for the user to detect a telephone number of a caller when an incoming call is received; making reference the telephone book data on the basis of the telephone number of the caller, and providing notification by switching the incoming call sound to a specified incoming call sound that differs from the ordinary incoming call sound in a case where a date of the incoming call coincides with the specified date for the caller.

A specified display image that differs from the display image for an ordinary incoming call displayed on the display part may be displayed on the display part when the incoming call sound is switched to the specified incoming call sound.

The system may be devised so that information about an incoming call sound and a display image for a specified date can be altered by rewriting the telephone book data.

Furthermore, reference may be made to the telephone book data when an alarm sound is emitted from the alarm sounding part in accordance with the arrival of a set time, and notification may be provided by switching the alarm sound to a specified alarm sound that differs from the ordinary alarm sound in a case where the date is a specified date obtained from the specified date information.

Furthermore, when the specified date information is registered in the telephone book data, the specified date information may be automatically registered in a schedule registration part for registering a schedule.

Furthermore, the user can automatically produce an incoming call sound and/or display an incoming call image or the like that allows the recognition of birthdays, or can sound a time alarm sound, on birth dates merely by registering such birth dates once in the telephone book utilizing a telephone book that can register birth dates together with names, telephone numbers and an indication that the specified date is a birthday.

Effects of the Invention

In the present invention, by utilizing the telephone book, it is possible to switch the incoming call sound, melody, display image, and the like to items that differ from the ordinary items on specified dates according to callers such as birthdays, wedding anniversaries, and the like. Accordingly, recognition of specified dates for callers is immediately possible at the time of incoming calls. Consequently, when a telephone call comes from the person in question on the specified date, the specified date can be recognized before the telephone is taken off the hook, and during the conversation, an immediate response is possible, such as the transmission of congratulatory words, e.g., "congratulations" or the like.

Furthermore, by utilizing the telephone book data in an alarm clock, it is possible to immediately recognize specified dates such as birthdays or the like when awakening in the morning or the like, even in cases where there is no telephone call from the person in question on the specified date, so that cases of meeting at the workplace or the like can also be handled, thus providing a high level of convenience.

Furthermore, by constructing the system so that registration is also automatically made in the schedule registration part when specified dates are registered in the telephone book data memory part, the need for duplicate registration operations is eliminated.

Furthermore, if a registration function for specified dates such as birthdays or the like is installed as a standard function in the telephone book data memory part, then, once registration is performed, the trouble of re-registration can be eliminated even in cases where the model of the mobile telephone is changed.

The present invention also offers the advantage of an enhanced entertainment value since the incoming call sound, display image, and the like are automatically altered on specified dates.

BRIEF DESCRIPTION OF THE DRAWINGS

FIG. 8 is a diagram showing a mobile telephone of the prior art.

KEY

Figure 1:
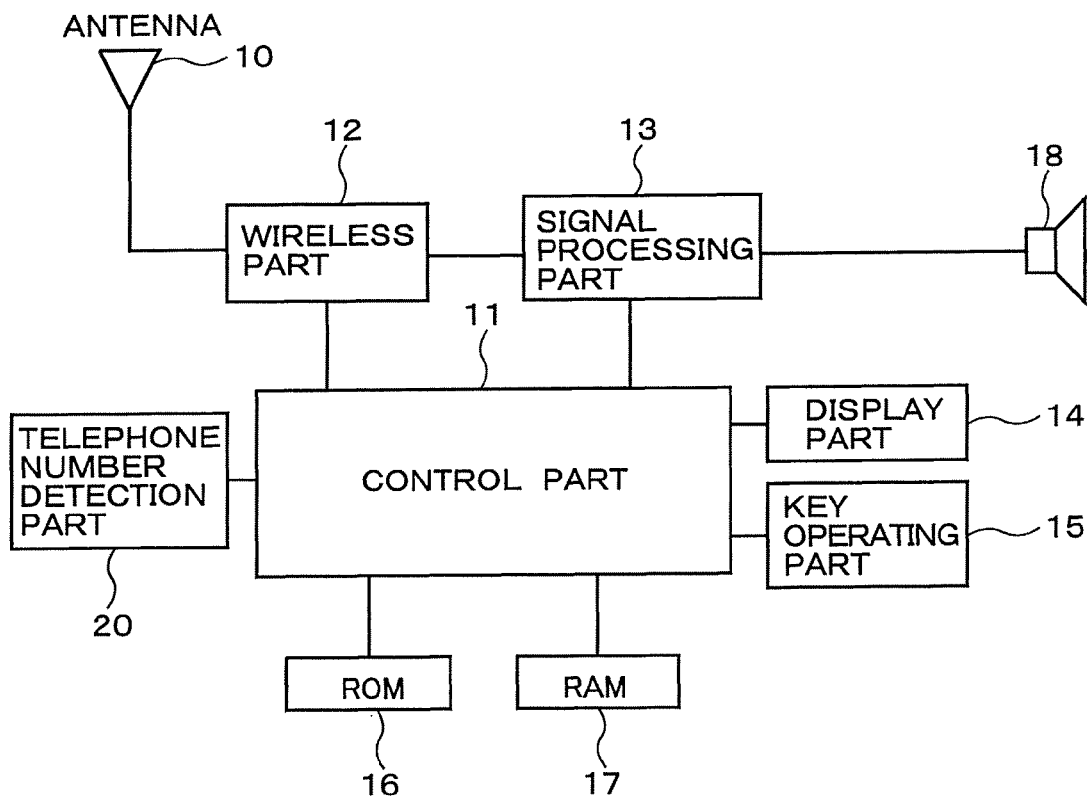
FIG. 1 is a block diagram showing the construction of a mobile telephone according to a first embodiment of the present invention.

10: Antenna
11: Control part
12: Wireless part
13: Signal processing part
14: Display part
15: Key operating pat
16: ROM
17: RAM
18: Speaker
19: Alarm clock part
20: Telephone number detection part

BEST MODE FOR CARRYING OUT THE INVENTION (Description of the Construction)

Embodiments of the present invention will be described in detail below with reference to the attached drawings. FIG. 1 is a block diagram showing the construction of a mobile telephone according to a first embodiment of the present invention.

The mobile telephone of the present embodiment is constructed from an antenna 10 which transmits and receives electromagnetic waves, a wireless part 12 having a wireless circuit used for transmission and reception, a signal processing part 13 which processes and outputs signals transmitted to the wireless part 12 or signals received by the wireless part 12, and which outputs incoming call sounds or the like, a key operating part 15 which is used to operate various functions using key input operations, a display part 14 which displays various types of information including incoming call images and the like, a control part 11 including a CPU (central processing unit) which controls the wireless part 12, signal processing part 13, display part 14, key operating part 15, and the like, a ROM (read only memory) 16 which is connected to the control part 11, and which stores (for example) programs for executing various functions such as mobile telephone calling, call receiving, conversation functions, and the like, telephone book function programs, and various application programs and the like that will be described later, in addition to character font data used for various displays and the like, a memory part 17 such as a RAM (random access memory) or the like which is connected to the control part 11, and in which telephone book data and the like are stored, a speaker 18 which is connected to the signal processing part 13, and which emits sounds, and a telephone number detection part 20 which is connected to the control part 11, and which detects the telephone number of the caller when an incoming call is received.

Figure 2:
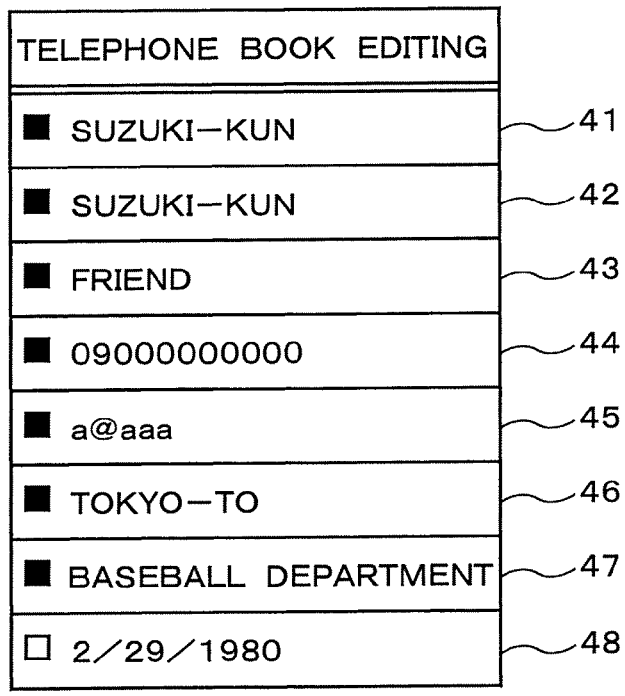
FIG. 2 is a diagram showing an example of the construction of the telephone book data in the present embodiment.

FIG. 2 is a diagram showing an example FIG. the construction of the recording of the telephone book in the present embodiment. A recording region 48 for registering specified dates such as birth dates (birthdays) and the like is provided in the telephone book recording region of the present embodiment in addition to a recording region 41 for registering names, a recording region 42 for registering phonetic transcriptions of names, a recording region 43 for registering group information and the like, a recording region 44 that allows the registering of a plurality of telephone numbers, a recording region 45 that allows the registering of a plurality of mailing addresses, a recording region 46 for registering addresses and the like, and a recording region 47 for registering memos.

The recording region 48 for registering specified dates can be set as one or a plurality of regions; it is desirable to construct this region so that incoming call sounds, melodies, or the like can be selectively registered in accordance with registered specified dates, so that links to these dates can be provided.

Here, the control part 11 has a function which searches for a registered telephone number in the recording region 44 of the telephone book function on the basis of the caller's telephone number detected by the telephone number detection part 20 when there is a notification of the caller's telephone number (incoming call number) from the side of the caller at the time of an incoming call, a function which judges whether or not there is individual data that matches the caller's telephone number in this recording region 44, and a function which refers to the recording region 48 for specified dates of the caller's telephone number in cases where there is data that matches this telephone number, and which detects whether or not there are items registered as specified dates that are the same as the date of the incoming call in the recording region 48. Furthermore, in cases where the presence of a registered item cannot be detected, the control part 11 outputs an ordinary incoming call sound or the like in response to the incoming call from the speaker 18 used as an incoming call notification part, and in cases where the presence of a registered item can be detected, the control part 11 outputs an incoming call sound and/or melody that is peculiar to the specified date in response to the incoming call from the speaker 18 used as an incoming call notification part. Furthermore, the control part 11 has the function of controlling the signal processing part 13 and display part 14 so that a screen display unique to the specified date is output.

(Description of Operation)

Figure 3:
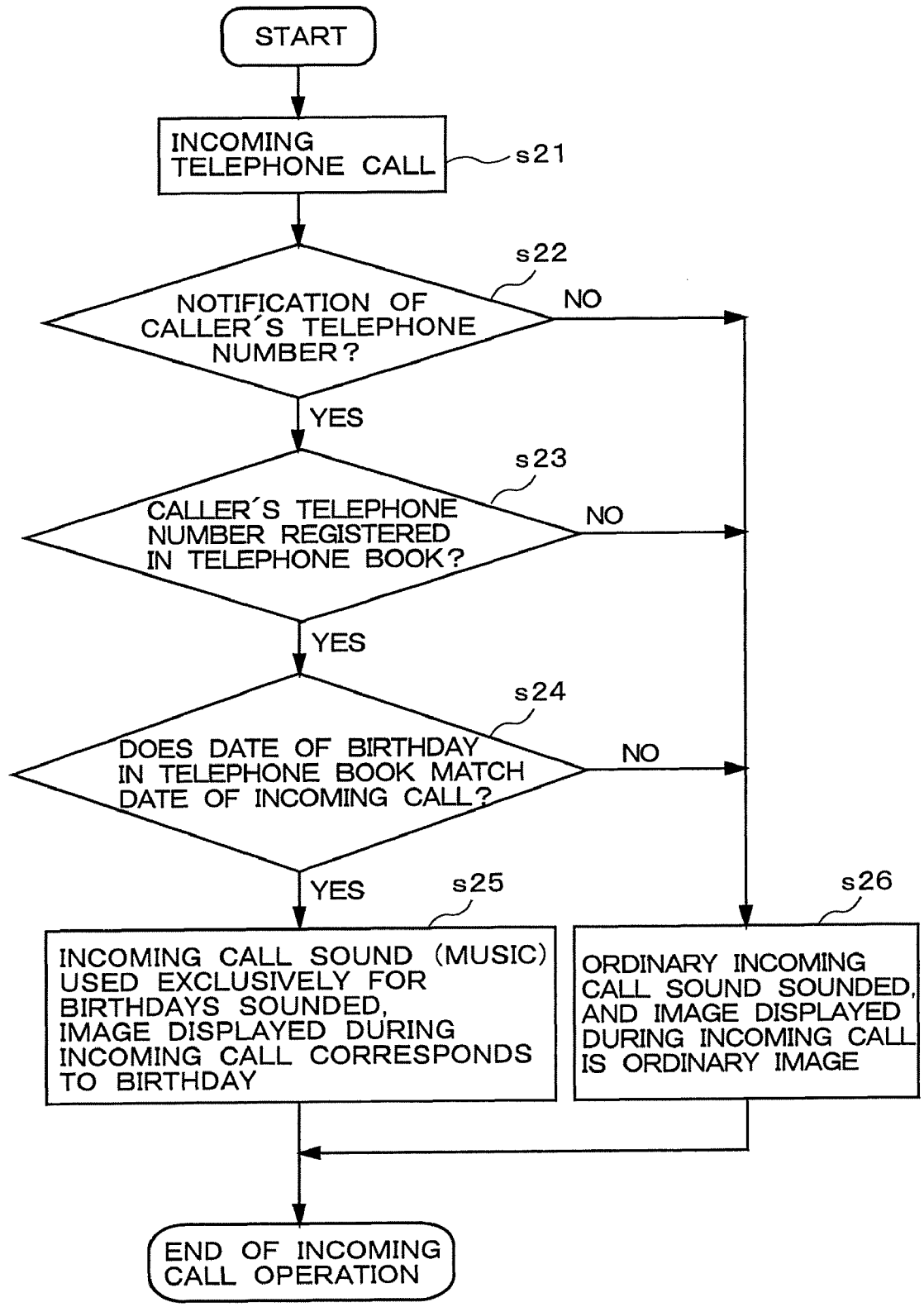
FIG. 3 is a flow chart showing the operation of the present embodiment.

FIG. 3 is a flow chart showing the operation of the present embodiment. The operation of the present embodiment will be described using the example of an incoming call from a caller on a birthday or the like.

When there is an incoming call from another telephone to the mobile telephone of the present embodiment (step s21), the control part 11 judges whether or not there is a notification of the caller's telephone number (incoming call number) (step s22). In cases where there is no notification of the caller's telephone number, the ordinary incoming call sound is sounded, and the ordinary image is also displayed during the incoming call (step s26). On the other hand, in cases where there is a notification of the caller's telephone number, a decision is made as to whether or not the incoming call number is registered in the telephone book (step s23), and in cases where this is not registered in the telephone book, the ordinary incoming call sound and ordinary image display are performed (step s26).

In cases where the caller's telephone number is registered in the telephone book in step s23, a decision is made as to whether or not there is a match between the date in question and a specified date such as a birthday or the like in the telephone book (step s24). In cases where there is no match between the date in question and a specified date such as a birthday or the like in the telephone book, the ordinary incoming call sound and ordinary image display are performed (step s26).

In cases where there is a match between the date in question and a specified date such as a birthday or the like in the telephone book, an incoming call sound used exclusively for birthdays or the like is sounded, and the image displayed on the display part 14 during the incoming call is also an image used for birthdays. Furthermore, this function is ended when the incoming call operation of the mobile telephone of the present embodiment is completed.

Figure 4:
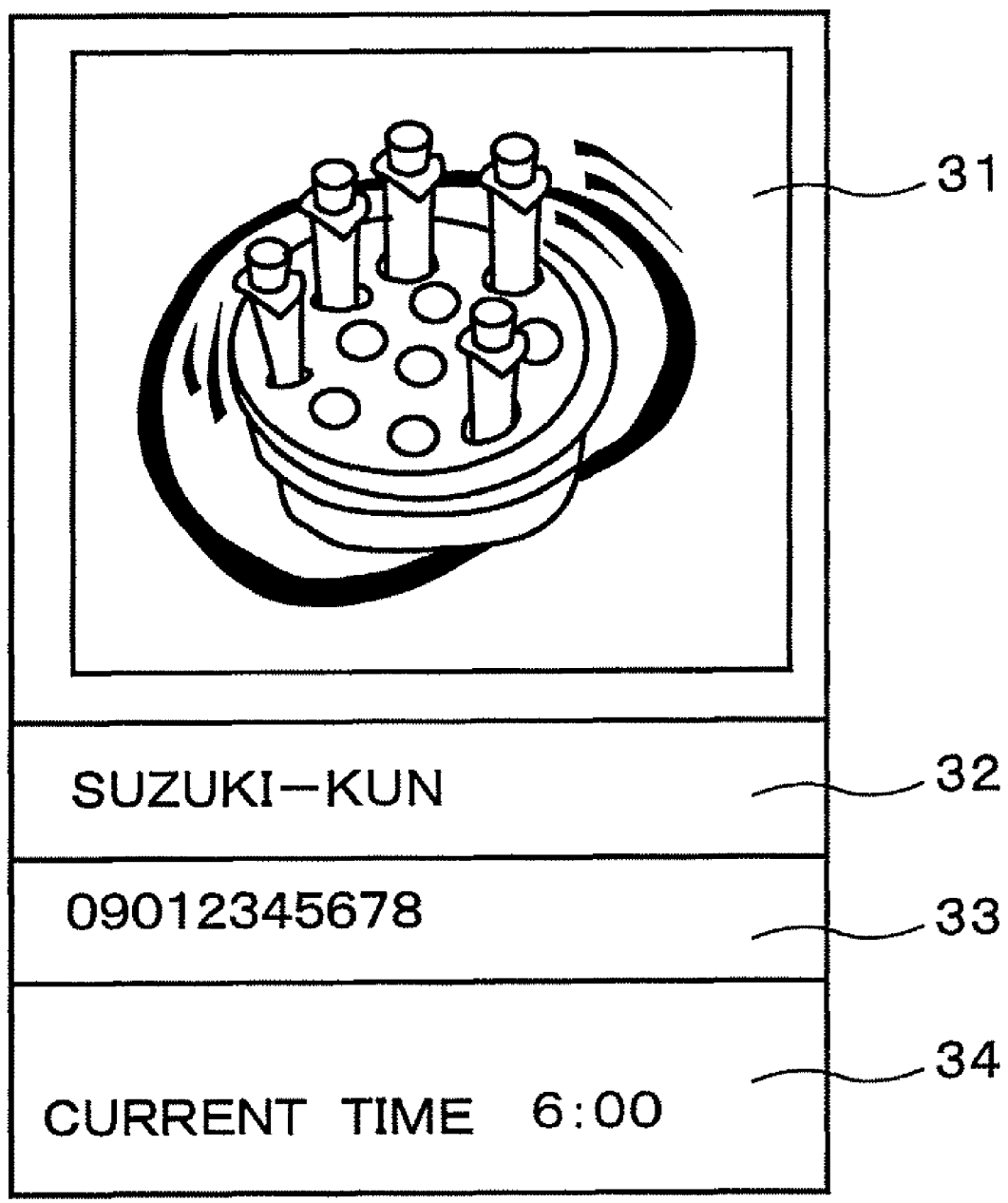
FIG. 4 is a diagram showing one example of the display image during an incoming call in the present embodiment.

FIG. 4 is a diagram showing one example of the display image that is displayed during incoming calls in the present embodiment. This is constructed from a display region 31 that displays images during incoming calls, a display region 32 that displays names registered in accordance with callers' telephone numbers in the telephone book, a display region 33 that displays incoming call numbers, and a display region 34 that displays the current time.

Figure 5:
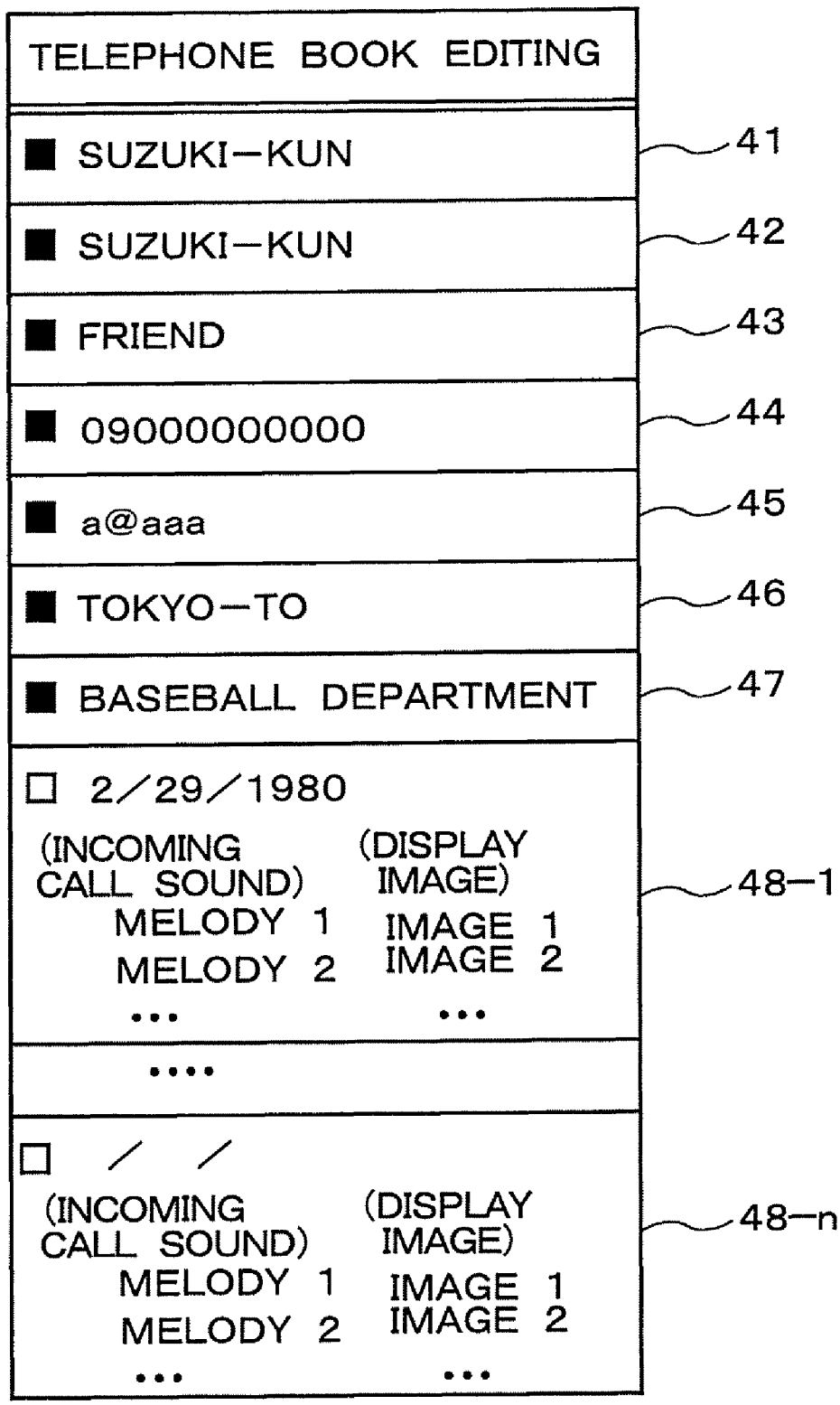
FIG. 5 is a diagram showing another example of the construction of the telephone book data in the present embodiment.

FIG. 5 is a diagram showing another example of the construction of the recording of the telephone book data in the present embodiment. Specified regions 48-1 through 48-n for a plurality of specified dates are provided, and the data is constructed so that incoming call sounds, melodies, and the like can be selected during the registration of desired specified dates. For example, dates of special occasions or the like can be input using keys; incoming call sounds, melodies, display images, and the like suitable for this date can be selected and set by entering checks in these items; and the control part 11 performs a control that provides notification to the speaker 18 and display part 14 of incoming calls using corresponding incoming call sounds and display images in accordance with the selected and set information.

Other Embodiments

Figure 6:
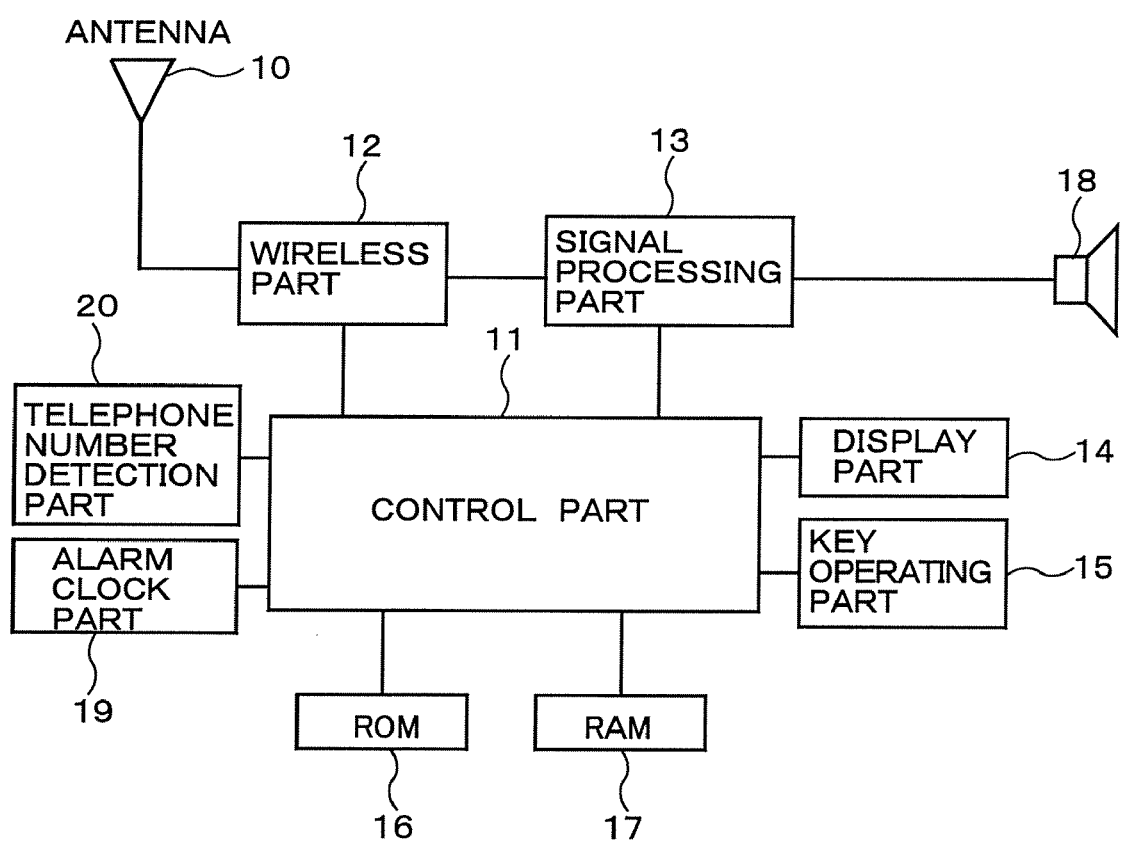
FIG. 6 is a block diagram showing the construction of a mobile telephone according to a second embodiment of the present invention.
Figure 7:
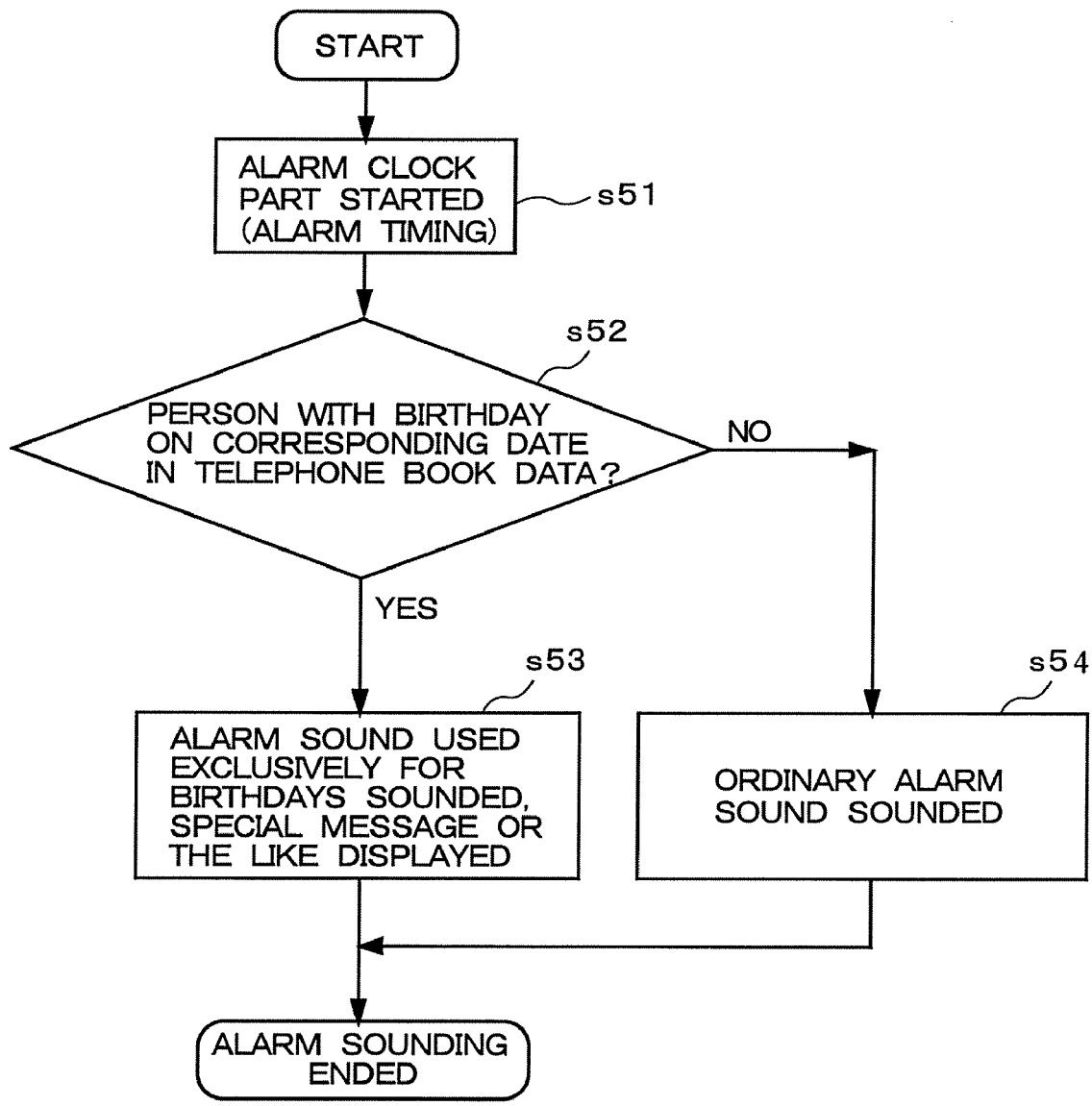
FIG. 7 is a flow chart showing the operation of this embodiment.

FIG. 6 is a block diagram showing the construction of a mobile telephone according to a second embodiment of the present invention, and FIG. 7 is a flow chart showing the operation of this embodiment. In the embodiment described above, a specified date is recognized by the presence of an incoming call based on notification of the caller's telephone number from a person on this specified date. Accordingly, this information cannot be recognized unless there is such an incoming call on the specified date. In the present embodiment, an alarm clock part 19 is provided as an alarm sounding part, and the recognition of specified dates is made possible in advance by utilizing registered information such as specified dates or the like added to the telephone book function during the sounding of an alarm sound by the alarm clock part 19. The basic construction is similar to that shown in FIG. 1, and the control part 11 makes reference to the telephone book data at the time that operation of the alarm clock part 19 is started, and at set times, and performs control that switches the alarm sound or the like.

The user starts by setting the alarm clock function of the mobile telephone. As is seen from the flow chart shown in FIG. 7, when the set alarm time is reached, the control operation of this alarm sound is initiated (step s51). The control part 11 refers to the telephone book data memory part at the alarm timing of the alarm clock part, and judges whether or not there is a person whose specified date such as a birthday or the like matches the date of this alarm timing among the registered data. For example, in cases where there is no person with this birthday among the birthdays registered in the telephone book, the ordinary alarm sound is sounded (step s54). On the other hand, in cases where there is a person with this birthday, an alarm sound used exclusively for birthdays is sounded, and a special message or the like is displayed on the display part 14 (step s53). This function is ended when the alarm operation is completed.

Furthermore, as a third embodiment of the present invention, the system can be constructed so that a schedule registration part that registers schedules is mounted in the mobile telephone, and registered information such as specified dates or the like added to the telephone book function is automatically registered in the schedule registration part when specified date information is registered in the telephone book function. For example, on days for which specified dates such as birthdays or the like are registered, these can automatically be registered on schedule dates, and reference can be made to this information at the time of added registration and utilization of schedule information.

Above, examples of mobile telephones were described as embodiments of the present invention; however, the present invention is not limited to mobile telephones, and clearly may be applied to telephones in general.

INDUSTRIAL APPLICABILITY

The present invention may be appropriately utilized in mobile telephones or the like that have an incoming call notification function.

The invention claimed is:

1. A telephone, which is characterized in comprising:
    a telephone book data memory part for storing a name of a telephone user, a telephone number, and specific date information specifying a specific date and an incoming call sound used exclusively for the specific date for the user;
    a detecting part for detecting a telephone number of a caller when an incoming call is received;
    a notification part for emitting an incoming call sound; and
    a control part, which refers to said telephone book data memory part and identifies the caller from said user name on the basis of the telephone number of the caller as detected by said detection part, which determines whether the specific date information for the specific date is the same date as the date when the incoming call is received is detected, and which controls said notification part so that notification is performed by switching the incoming call sound to the incoming call sound used exclusively for the specific date when the specific date information for the specific date is the same date as the date the incoming call is received is detected.

2. The telephone according to claim 1, which is characterized in having a display part for displaying images, wherein said control part controls said display part so that the image is switched to a specified display image that differs from the ordinary incoming call display image, and so that this image is displayed, in cases where the incoming call sound is switched to said specified incoming call sound.

3. The telephone according to claim 1, which is characterized in that information about an incoming call sound and a display image for a specified date can be registered in said telephone book data memory part.

4. The telephone according to claim 1, which is characterized in having an alarm sounding part that emits an alarm sound when a set time has arrived, wherein said control part refers to information stored in said telephone book data memory part when said alarm sounding part emits an alarm sound, and, controls said alarm sounding part so that notification is made by switching the alarm sound to a specified alarm sound that differs from the ordinary alarm sound in a case where the date is a specified date obtained from said specified date information.

5. The telephone according to claim 1, which is characterized in having a schedule registration part for registering a schedule, wherein said control part automatically registers said specified date information in said schedule registration part when said specified date information is registered in said telephone book data memory part.

6. The telephone according to claim 1, which is characterized in that said specified date is a birthday.

7. An incoming call notification method for a telephone, which is characterized in comprising:
    using telephone book data that is loaded in the telephone and that registers a name of a telephone user, a telephone number, specified date information specifying a specific date and an incoming call sound used exclusively for the specific date for the user to detect a telephone number of a caller when an incoming call is received;
    making reference to said telephone book data on the basis of the telephone number of the caller;
    determining whether the specific date information for the specific date is the same date as the date when the incoming call is received is detected, and
    providing notification by switching the incoming call sound to the incoming call sound used exclusively for the specific date when the specific date information for the specific date is the same date as the date the incoming call is received is detected.

8. The incoming call notification method for a telephone according to claim 7, which is characterized in that a specified display image that differs from the display image for an ordinary incoming call displayed on the display part is displayed on the display part when the incoming call sound is switched to said specified incoming call sound.

9. The incoming call notification method for a telephone according to claim 7, which is characterized in that information about an incoming call sound and a display image for a specified date can be altered by rewriting said telephone book data.

10. The incoming call notification method for a telephone according to claim 7, which is characterized in comprising:
    making reference to said telephone book data when an alarm sound is emitted from the alarm sounding part in accordance with the arrival of a set time; and
    providing notification by switching the alarm sound to a specified alarm sound that differs from the ordinary alarm sound in a case where the date is a specified date obtained from said specified date information.

11. The incoming call notification method for a telephone according to claim 7, which is characterized in that when said specified date information is registered in said telephone book data, said specified date information is automatically registered in a schedule registration part for registering a schedule.

12. The incoming call notification method for a telephone according to claim 7, which is characterized in that said specified date is a birthday.

* * * * *